United States Patent [19]

Zielke

[11] 4,415,301
[45] Nov. 15, 1983

[54] CASSETTE HANDLING DEVICE

[75] Inventor: Darrell W. Zielke, Valencia, Calif.

[73] Assignee: West American Sound, Inc., North Hollywood, Calif.

[21] Appl. No.: 151,326

[22] Filed: May 19, 1980

[51] Int. Cl.³ .................... B65G 57/30; B65G 60/00
[52] U.S. Cl. .................................. 414/31; 198/345; 221/67; 360/92; 414/32; 414/96; 414/126; 414/129
[58] Field of Search .......... 414/31, 32, 34, 92, 414/96, 125, 126, 127, 129; 360/92; 242/56 R; 221/67, 289; 29/806; 198/345

[56] References Cited

U.S. PATENT DOCUMENTS

| | | | |
|---|---|---|---|
| 2,970,708 | 2/1961 | Watanabe et al. | 414/96 X |
| 3,710,976 | 1/1973 | Guidi et al. | 221/67 |
| 3,756,608 | 9/1973 | O'Neill et al. | 360/92 |
| 3,758,122 | 9/1973 | Kawaharasaki | 414/32 X |
| 3,767,207 | 10/1973 | Okabe | 414/32 X |
| 3,848,825 | 11/1974 | Zielke | 242/56 R |
| 3,886,591 | 5/1975 | Bettini | 414/32 X |
| 4,071,857 | 1/1978 | Whitney et al. | 360/92 |
| 4,216,052 | 8/1980 | Zielke | 242/56 R X |

FOREIGN PATENT DOCUMENTS 2707548 9/1977 Fed. Rep. of Germany ........ 360/92

*Primary Examiner*—Leslie J. Paperner
*Attorney, Agent, or Firm*—Lyon & Lyon

[57] ABSTRACT

A system for the handling of cassettes which are nested in a predetermined pattern to individually remove, orient and deliver each cassette to a work station and then nest in another predetermined pattern the cassettes having passed through the work station. The disclosed system includes an input hopper mechanism including a magazine and a gate, a track system for conveying cassettes from the hopper, a system for removing cassettes to a work station and returning the cassettes to a track, and an output hopper mechanism including an output magazine and a gate means for controlling the input and orientation of cassettes into the output hopper.

20 Claims, 20 Drawing Figures

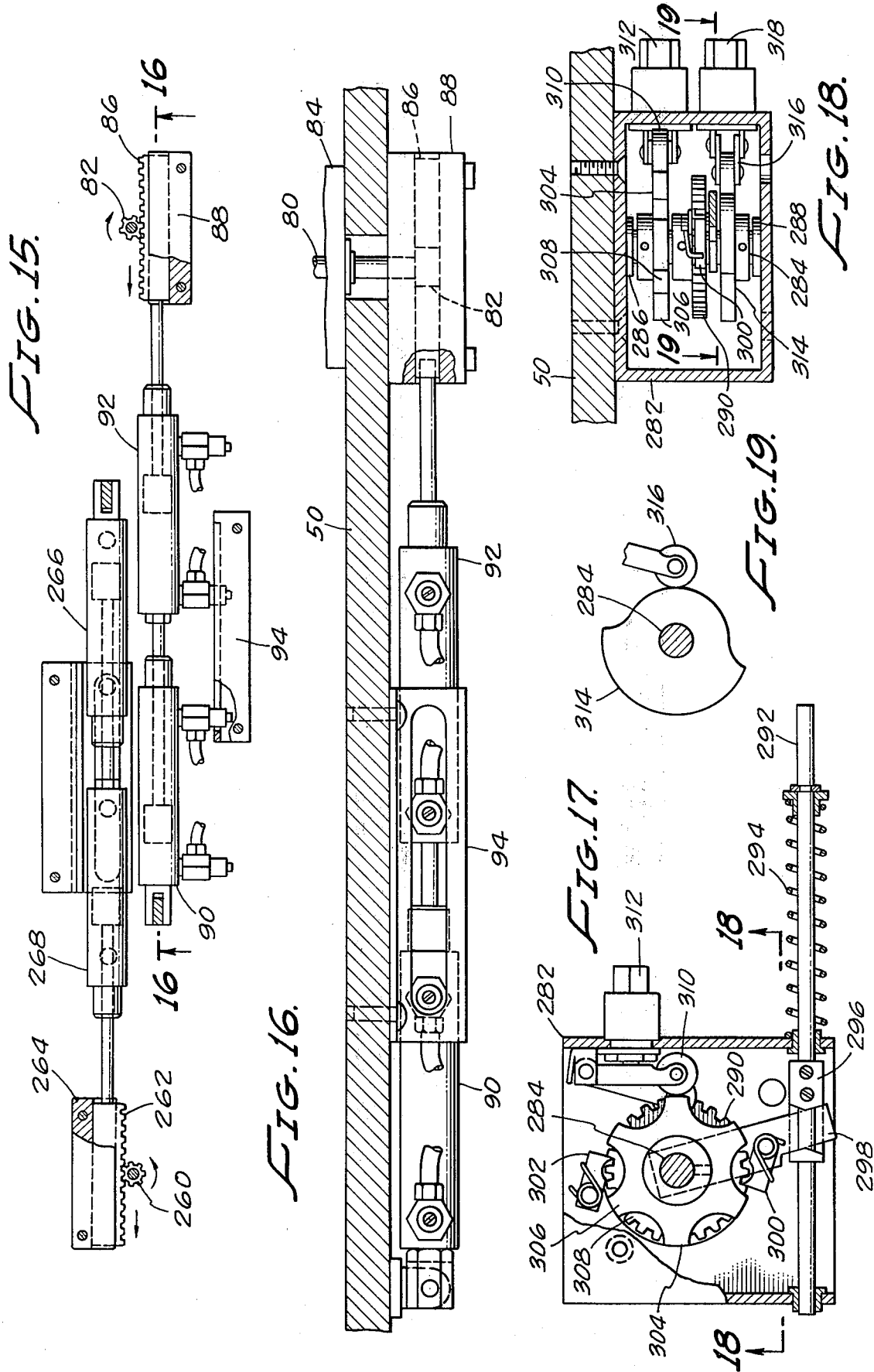

CASSETTE HANDLING DEVICE

BACKGROUND OF THE INVENTION

The present invention is directed to a device for handling magnetic tape cassettes.

As the electronic industry has developed greater and greater markets in consumer devices, standardization of the packaging for magnetic tape has resulted. Of the standardized tape holders, 8 track cartridges, audio cassettes and ¾" and 1" video cassettes have become most accepted. With the great magnitude of such devices, mechanisms for rapidly loading either prerecorded or unrecorded magnetic tape into these holders has become economically required. One such device for splicing and loading electromagnetic tape onto a cassette is disclosed in U.S. Pat. No. 3,848,825. This patent is incorporated herein by reference to illustrate the sequence of operation of such a splicing and loading mechanism. The threading of the mechanism disclosed in U.S. Pat. No. 3,848,825 was accomplished by hand. To further expedite the loading of such cassettes, another device was developed for the automatic threading of cassettes once placed on the spindles of the cassette loading devices. This threading mechanism is disclosed in U.S. Pat. No. 4,216,052. The disclosure of this patent is also incorporated herein by reference to particularly illustrate a threading mechanism. Thus, devices have been developed heretofore which, when used in combination, require an operator to simply place an empty magnetic tape cassette onto the spindles of the device, initiate operation of the mechanism and package the resulting loaded cassettes ejected from the mechanism.

It has been long understood in the industry that great advantage would be realized in terms of time and expense if such empty magnetic tape holders could be loaded directly from the box into a mechanism which automatically placed each holder on a threading and loading mechanism from a stack of holders and later restacked the loaded holders for shipment or further inspection. However, a difficulty has been that with at least certain of the cassettes, the tape access ports are wider than the overall package. Consequently, the unloaded holders come stacked with the tape access ports facing in opposite directions in an alternating pattern. Thus, the holders can be stacked. This increases the technical difficulties associated with automatic feeding of packages for loading. This difficulty is further complicated by the fact that it is often desirable to place the loaded cassettes either back in the same alternating pattern or in alternating series of six for stacking prior to tape inspection.

SUMMARY OF THE INVENTION

The present invention is directed to a handling system and elements thereof the complete mechanism of which is capable of receiving a stack of unloaded magnetic tape holders with the tape access ports of these packages facing in either or both of two directions in the stack, loading these packages onto a mechanism for loading magnetic tape in each of the holders and restacking the loaded holders in either the same or another pattern. For loading such holders, it is only necessary for an operator, using the present mechanism, to take the holders from the carton and stack them as is into a magazine. Loaded holders are then removed from the opposite end of the device.

The preferred use of the present invention is for the loading of such holders and preferably cassettes with magnetic tape. This magnetic tape could either be prerecorded or blank depending on the intended purpose. It is also true that the mechanism of the present invention could be employed and is anticipated to be employed in combination with a tape recorder much as records are stacked for playing on the phonograph today. The present invention is further contemplated specifically for use with standard audio cassettes. However, variations in dimension of the elements would make the device equally suitable for other magnetic tape holders. The term "cassette" as used henceforth is intended to refer to all such categories of memory tape holders.

To accomplish the handling functions of the present invention, a device has been designed which includes a first magazine into which empty cassettes are positioned. A gate beneath the magazine accepts cassettes one at a time and orients each individual cassette. The cassette then moves onto a track where it is conveyed to a section of the track that is pivotally mounted to lift the cassette to a work station. Once the required work is performed on the cassette, it returns to the main track sections and is moved to a second gate. The tape is then forced upwardly through the gate and is oriented into a predetermined arrangement in an output magazine. The cassettes may be then periodically removed from the output magazine for further inspection or for packaging. A mechanism is also provided for disabling the operation of the output gate mechanism such that cassettes not properly loaded can be ejected rather than stacked in the output magazines.

Accordingly, it is an object of the present invention to provide a cassette handling device.

Another object of the present invention is to provide a cassette handling device for individually handling cassettes stacked with the tape access ports thereof facing in either one or both of two directions.

A further object of the present invention is to provide a cassette handling device for conveying aligned cassettes to a remote work station.

Other and further objects and advantages will appear hereinafter.

BRIEF DESCRIPTION OF THE DRAWINGS

FIG. 15 is a detailed plan of a plate indexing means of the present invention.

FIG. 16 is a detailed elevation taken along lines 16—16 of FIG. 15.

FIG. 17 is a detailed plan of a control mechanism for selective orientation of loaded cassettes for placement in the output magazine.

FIG. 18 is a cross-sectional elevation of the device of FIG. 17 taken along line 18—18.

FIG. 19 is a plan of a cam and follower of the device of FIG. 18 taken along line 19—19.

DETAILED DESCRIPTION OF THE PREFERRED EMBODIMENT

Turning in detail to the drawings, the illustrated preferred embodiment includes a cassette handling device associated with a cassette loader having an automatic threading mechanism. The handling device of the present invention is equally useful with recorders and playback equipment and is not to be limited by the association of the preferred embodiment with a cassette loader. The present invention is also adaptable for use with other than the standard audio cassettes illustrated, albeit major advantages are realized with the standard audio cassette.

Figure 1:
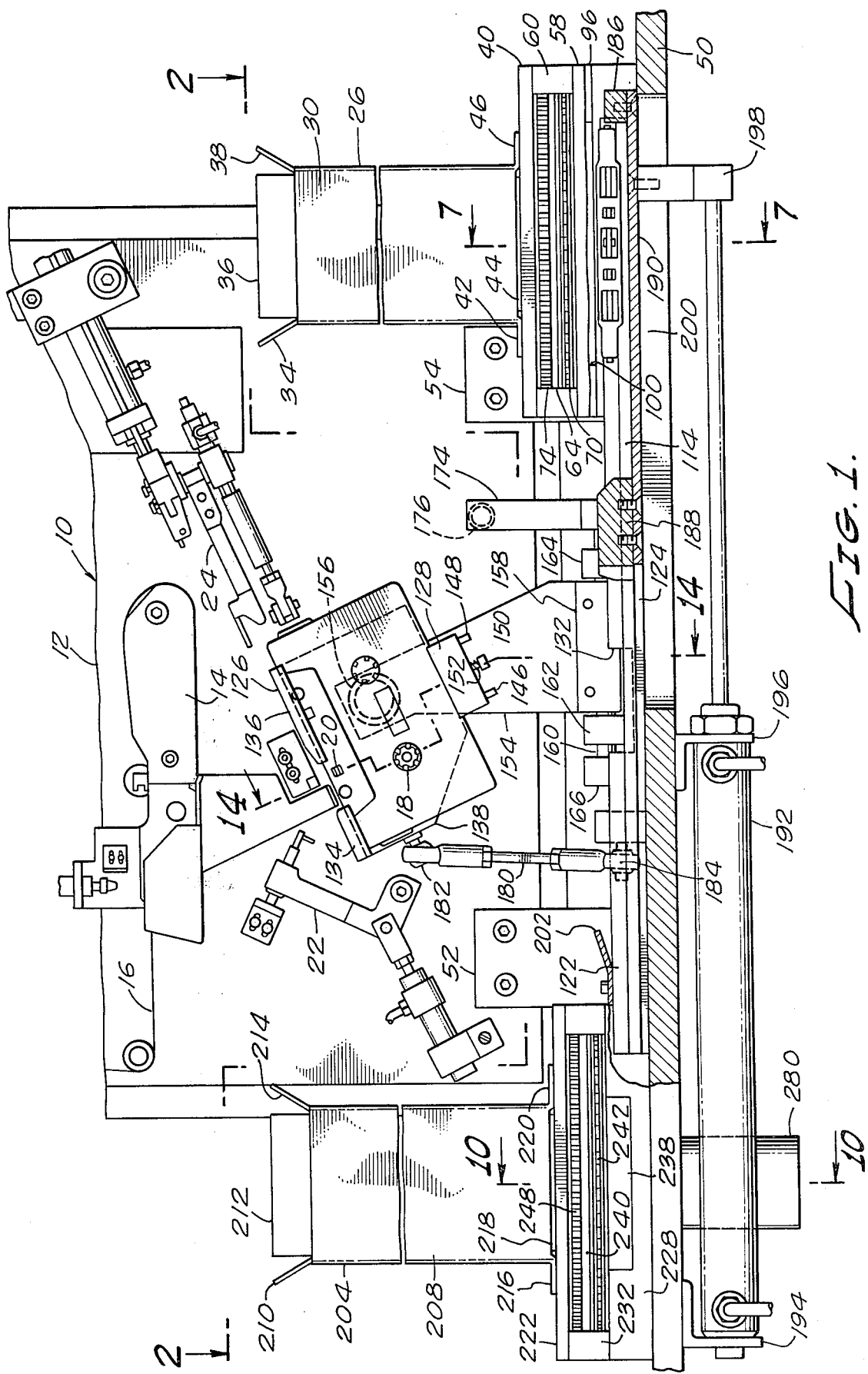
FIG. 1 is a front view of the device of the present invention with a cassette positioned for loading on a tape loading mechanism.

FIG. 1 provides an overview of the present mechanism and illustrates the cassette handling device of the present invention in association with a cassette loader, generally designated 10. The cassette loader 10 includes a front mounting plate 12. A tape splicing guide 14 is fixed to the front mounting plate 12 to receive magnetic tape 16 as well as leader from a cassette for splicing and loading. The cassette loader also includes a spindle 18 to drive one of the cassette reels. The front mounting plate 12 has been modified for purposes of the present invention to include a guide pin 20 designed to mate with a reference hole on standard audio cassettes to insure proper indexing of the cassette on the face of the cassette loader. As the present invention may be employed with other than a cassette loader, e.g., a recorder or playback equipment, the loader itself is only of peripheral interest here and the operation of such loaders is best understood by reference to U.S. Pat. No. 3,848,825 and the references cited therein, the disclosures of which are incorporated herein by reference.

Also of peripheral interest here is the automatic threading mechanism illustrated. The mechanism illustrated is found in the disclosure of U.S. Pat. No. 4,216,052, the disclosure of which is incorporated herein by reference. Illustrated in FIG. 1 is a leader pickup assembly 22 which acts to pluck a loop of leader from a cassette mounted at the work station on the front of the cassette loader 10. A leader placement assembly 24 acts to grab the loop of leader formed by the leader pickup assembly 22 and to place that leader on the tape splicing guide 14 such that the cassette loader may then begin operation.

Figure 2:
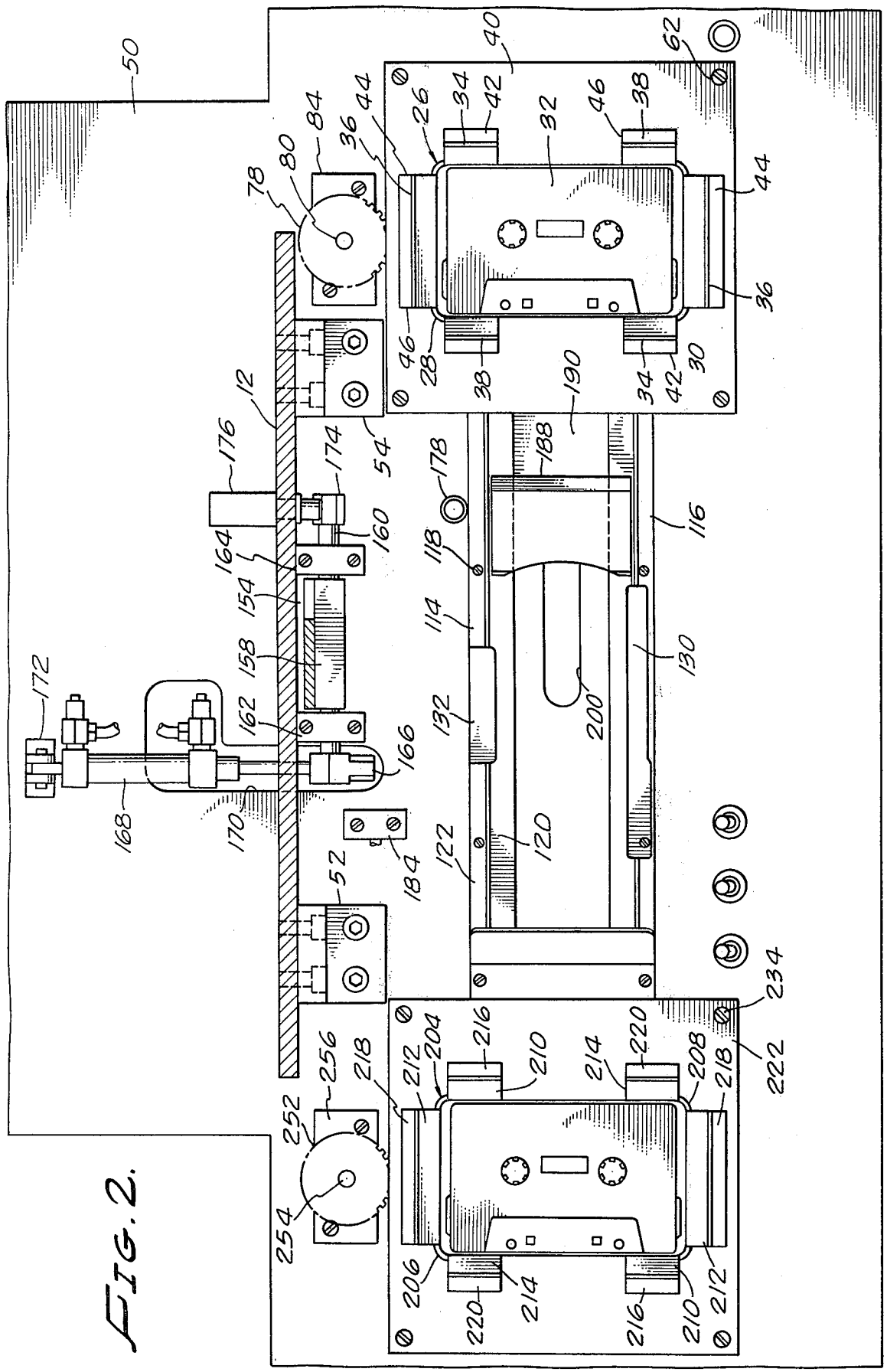
FIG. 2 is a cross-sectional plan taken along line 2—2 of FIG. 1.

Turning then specifically to the cassette handling mechanism of the present invention, the overall function of the preferred embodiment is to take cassettes stacked in a predetermined arrangement in an input magazine, sequentially present individual cassettes from the stack at the work station of the cassette loader for loading and then restack the cassettes in a predetermined arrangement in an output magazine. As shown, empty cassettes are typically packed with the tape access ports thereof oriented in a predetermined pattern such that the tape access ports alternately face in opposite directions. This predetermined pattern is employed because the cassettes are thicker at the tape access port than they are at what may be termed the back end thereof. Thus, such a nesting arrangement is advantageous. The input magazine 26 is designed to receive such a vertical stack of cassettes. The magazine 26 is formed by two channels 28 and 30 as can best be seen in FIG. 2. A stack of cassettes 32 is illustrated in this input magazine 26 as being oriented such that the channels 28 and 30 loosely extend around either end of the cassettes in the stack 32 to support the stack 32 and keep the cassettes oriented as shown.

The channels 28 and 30 conveniently do not extend to meet one another in order that manual access to the stack of cassettes 32 is provided. To further aid in the manual loading of the input magazine 26, the channels 28 and 30 include flared tabs 34, 36 and 38 which help to guide the operator in placing cassettes into the input magazine 26. The height of the channels 28 and 30 are determined solely by the convenience to the operator. The more cassettes which can be loaded into the input magazine 26, the less often the operator must return to load the machine. However, as exessively high magazine would make it more difficult for the operator to load the cassettes.

The channels 28 and 30 of the input magazine 26 are fixed to and supported by a guide plate 40. Mounting flanges 42, 44 and 46 are formed from the bottom of each of the channels 28 and 30 and are fastened to the upper side of the guide plate 40. The guide plate 40 includes a port 48 sized to freely pass the stack of cassettes 32 therethrough. This port 48 is tapered as can best be seen in FIG. 7 to operate to center cassettes as they pass therethrough.

Support for the guide plate 40 and in turn the input magazine 26 is accomplished by means of a frame for substantially the entire handling mechanism. The frame includes a main frame member in the form of a mounting plate 50. The mounting plate 50 is conveniently positioned horizontally in front of the front mounting plate 12 of the cassette motor 10. This mounting plate 50 is fastened to the front mounting plate 12 of the cassette loader 10 by means of angle brackets 52 and 54. Other support of course may be provided where necessary to prevent the mounting plate 50 from becoming misaligned with the cassette loader 10. Fixed to the mounting plate 50 for support of the guide plate 40 and in turn the input magazine 26 are input hopper mounting blocks 56 and 58. These input hopper mounting blocks 56 and 58 extend parallel to a track described below. Four frame posts 60 are fixed to the mounting blocks 56 and 58 at the outer ends thereof as can best be seen in FIG. 4. These posts 60 extend upwardly as seen in FIG. 1 to support the guide plate 40 and in turn the input magazine 26. Fasteners 62 hold the guide plate 40, the input magazine 26 and the frame posts 60 in position on the hopper mounting blocks 56 and 58.

Located beneath the guide plate 40 is a first gate means for controlled release of cassettes from the input magazine 26 with alignment of the cassettes onto a track discussed in greater detail below. The first gate means includes two plates. The first plate 64 is pivotally mounted to the hopper mounting blocks 56 and 58. The first plate 64 is best seen in FIGS. 3, 7, 8 and 9. The periphery of the first plate 64 is divided into a cylindrical portion 66 and a flange portion 68. A thrust bearing 70 is positioned about the cylindrical portion 66 beneath the flanged portion 68. The lower race of the thrust bearing 70 is fixed to the hopper mounting blocks 56 and 58. A first gate 72 extends through the first plate 64. This first gate 72 is rectangular such that a cassette aligned with the gate 72 can freely pass therethrough. Because the width of the first gate 72 is less than the major dimension of a standard cassette, a cassette will be retained on the top of the first plate 64 when it is not aligned with the first gate 72. As the input magazine 26 and the guide plate 40 define the orientation of cassettes contained therein, control of the angular orientation of the pivotally mounted first plate 64 allows selective control of the passage of cassettes through the first gate 72.

The angular orientation of the first plate 64 relative to the remaining components of the first gate means is controlled by a first plate indexing means. This indexing means pivotally drives and positions the first plate to control passage of cassettes through the first gate 72. This indexing means includes a ring gear 74 fixed to the top surface of the flange portion 68 of the first plate 64. Fasteners 76 are provided to fix the ring gear 74 to the plate 64 as can best be seen in FIGS. 3 and 7. The ring gear 74 is coupled to and driven by a spur gear 78. A shaft 80 is coupled to the spur gear 78 at a first end of the shaft 80 and has a pinion 82 at the other end. The shaft 80 is rotatably mounted relative to the mounting plate 50 in bearing assembly 84. Beneath the mounting plate 50 and coupled to the pinion 82 a rack 86 is slidably contained within rack guide 88. Tracing back through the gear train of the indexing means, longitudinal movement of the rack 86 in the rack guide 88 results in pivotal movement of the first plate 64.

A drive mechanism is provided for the rack 86 to provide three rest positions for the rack 86 and consequently the first plate 64. This drive includes a first pneumatic cylinder 90 which is coupled at a first end to the mounting plate 50. The second or piston end of the first pneumatic cylinder 90 is coupled to a first end of a second pneumatic cylinder 92. The second or piston end of the second pneumatic cylinder 92 is then directly coupled to the rack 86. By selecting the several combinations of piston positions within both of the pneumatic cylinders 90 and 92, three rest positions for the rack 86 can be achieved. As stated above, these three positions have corresponding positions for the first plate 64. The rack drive also includes a slotted guide plate 94 which constrains a hose fitting on each of the pneumatic cylinders 90 and 92 to prevent rotation of the cylinders. The bracket 94 is fixed to the underside of the mounting plate 50 for this purpose.

The drive for the first plate 64 is designed so that the three angular positions associated with the plate 64 include a first position with the major dimension of the first gate 72 at right angles to the major dimension of the port 48 in the guide plate 40. The second position of the first plate 64 is 90 degrees in a first angular direction from the first position while the third position is 90 degrees in the opposite angular direction from the first position. These positions have been selected so that the first gate 72 may be pivoted to receive the lower most cassette positioned in the port 48 such that the tape access port of that cassette is adjacent a first side of the first gate 72. By having each tape access port of the cassettes received in the same orientation relative to the first gate 72, the cassettes will be properly oriented for further handling when the first plate 64 rotates back to the middle or first position.

Figure 4:
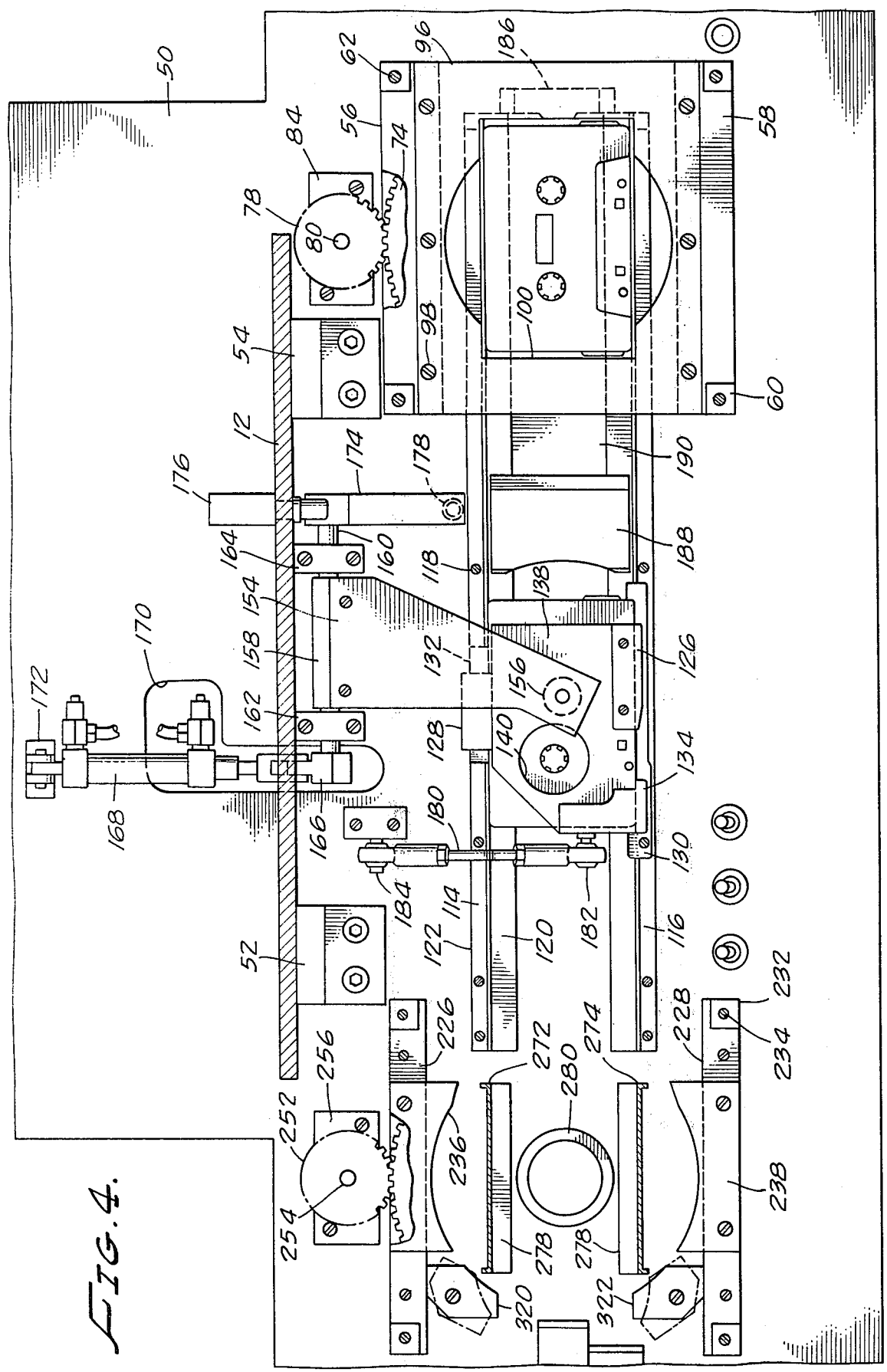
FIG. 4 is a cross-sectional plan as in FIG. 2 with the magazines, fixed plates and pivotally mounted plates broken away for clarity. The opposed channels and arm of the third section of track is shown in the lowered position.
Figure 7:
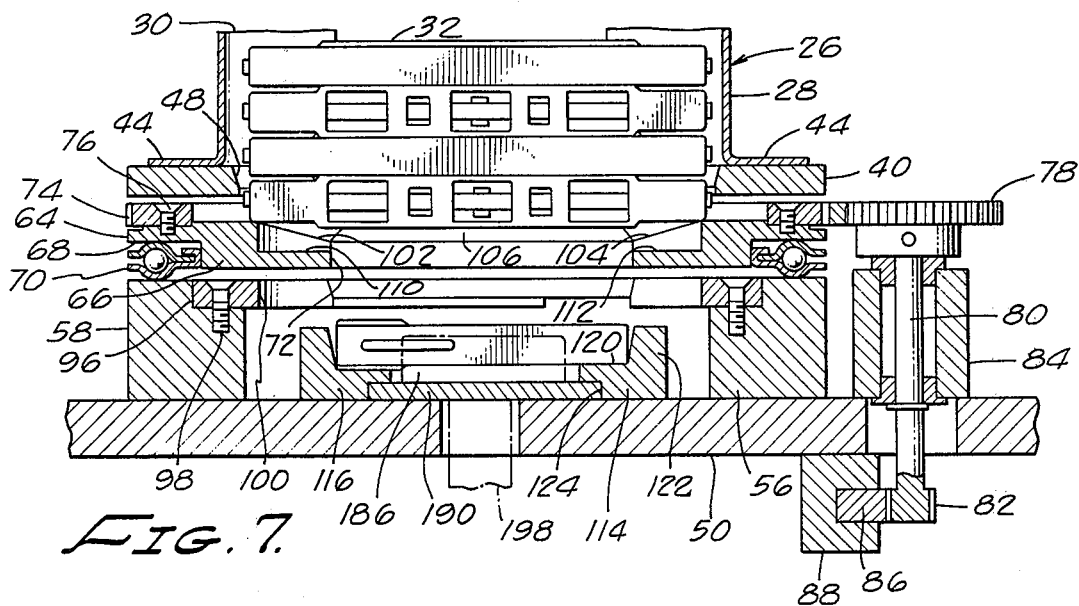
FIG. 7 is a cross-sectional elevation taken along line 7—7 of FIG. 1.
Figure 8:
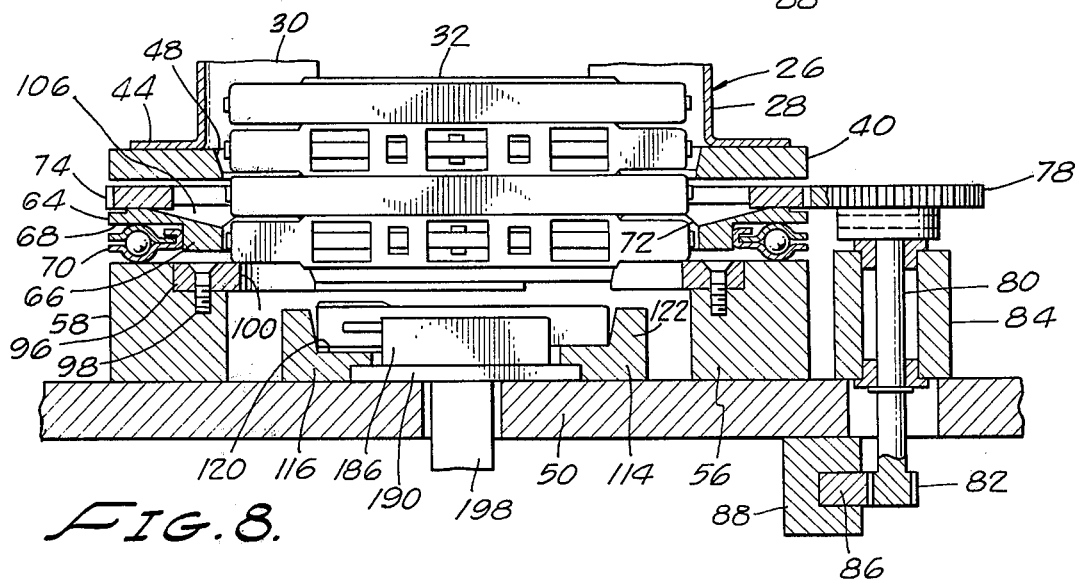
FIG. 8 is a cross-sectional elevation taken along line 7—7 of FIG. 1 illustrating a different operative position of the system.
Figure 9:
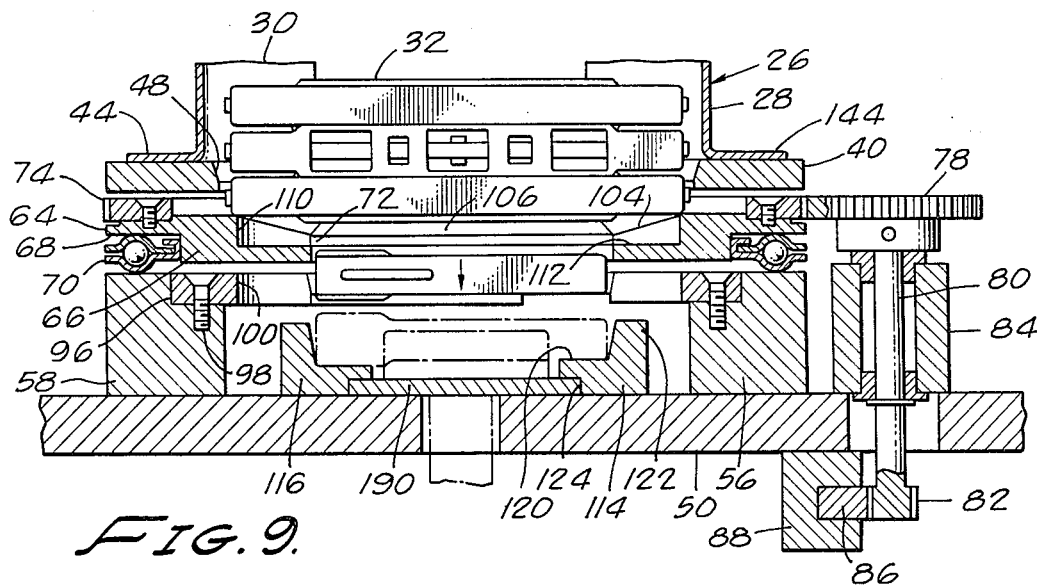
FIG. 9 is a cross-sectional elevation taken along line 7—7 of FIG. 1 illustrating yet another operational position of the system.

Below the first plate 64, there is a second plate 96 which is fixed by means of fasteners 98 to the hopper mounting block 56 and 58. This second plate 96 includes a second gate 100. This plate can best be seen in FIG. 4. The second gate 100 is generally rectangular with arc shaped portions cut into the two long sides of the rectangle. The generally rectangular shape is sized to accommodate a cassette for easy passage through the second plate 96 when the cassette is angularly aligned with the rectangular opening. When the cassette is not so aligned, the opening is too small to allow passage thereof. The arc portions of the second gate 100 are included to prevent the protruding portion of the tape access ports to hang up on the second plate 96 at the edge of the second gate 100. As can be seen in FIG. 4, the portion of the rectangular opening which has been cut away in the form of an arc is wider than the tape access port. Rotation of the cassette as it rests upon the second plate 96 is thus facilitated. The second gate 100 is also slightly tapered as can be seen in FIGS. 7, 8 or 9 to aid in guiding and centering cassettes passing therethrough.

The spacing between the top surface of the first plate 64 at the entrance to the first gate 72 and the top surface of the second plate 96 is approximately one cassette thickness so that the first plate 64 is able to receive only one cassette at a time. The stack of cassettes rests on the top of the first plate 64 until the first plate 64 is pivoted for alignnment of the stack of cassettes with the first gate 72. The condition before such alignment is illustrated in FIG. 7. The condition illustrating angular alignment of the first gate 72 with the stack of cassettes is illustrated in FIG. 8 where the stack of cassettes has dropped down into the first gate 72 and has come to rest on the top surface of the second plate 96. The major dimension of the second gate 100 is perpendicular in the present embodiment to the major dimension of the cassettes located in the magazine 26. Thus, when the first plate 64 is angularly aligned with the stack of cassettes 32, the second gate 100 is misaligned with the stack and prevents the stack of cassettes from passing through the second gate 100.

Once the stack of cassettes comes to rest on the top of the second plate 96, the first plate 64 may be rotated to bring the first gate 72 into angular alignment with the second gate 100. As the first plate 64 rotates, the cassette contained within the first gate 72 is forced to rotate also. The cassettes above the first gate 72, however, are constrained to remain in alignment with the magazine 26 and the guide plate 40. Thus, as the first plate 64 rotates, all but one of the cassettes in the cassette stack 32 become misaligned with the first gate 72 and are thereby prevented from passing through that first gate. Once rotation of the first plate 64 is complete, the first gate 72 and the second gate 100 are aligned and the cassette contained within the first gate 72 can pass through the second gate 100. This condition is illustrated in FIG. 9.

Figure 3:
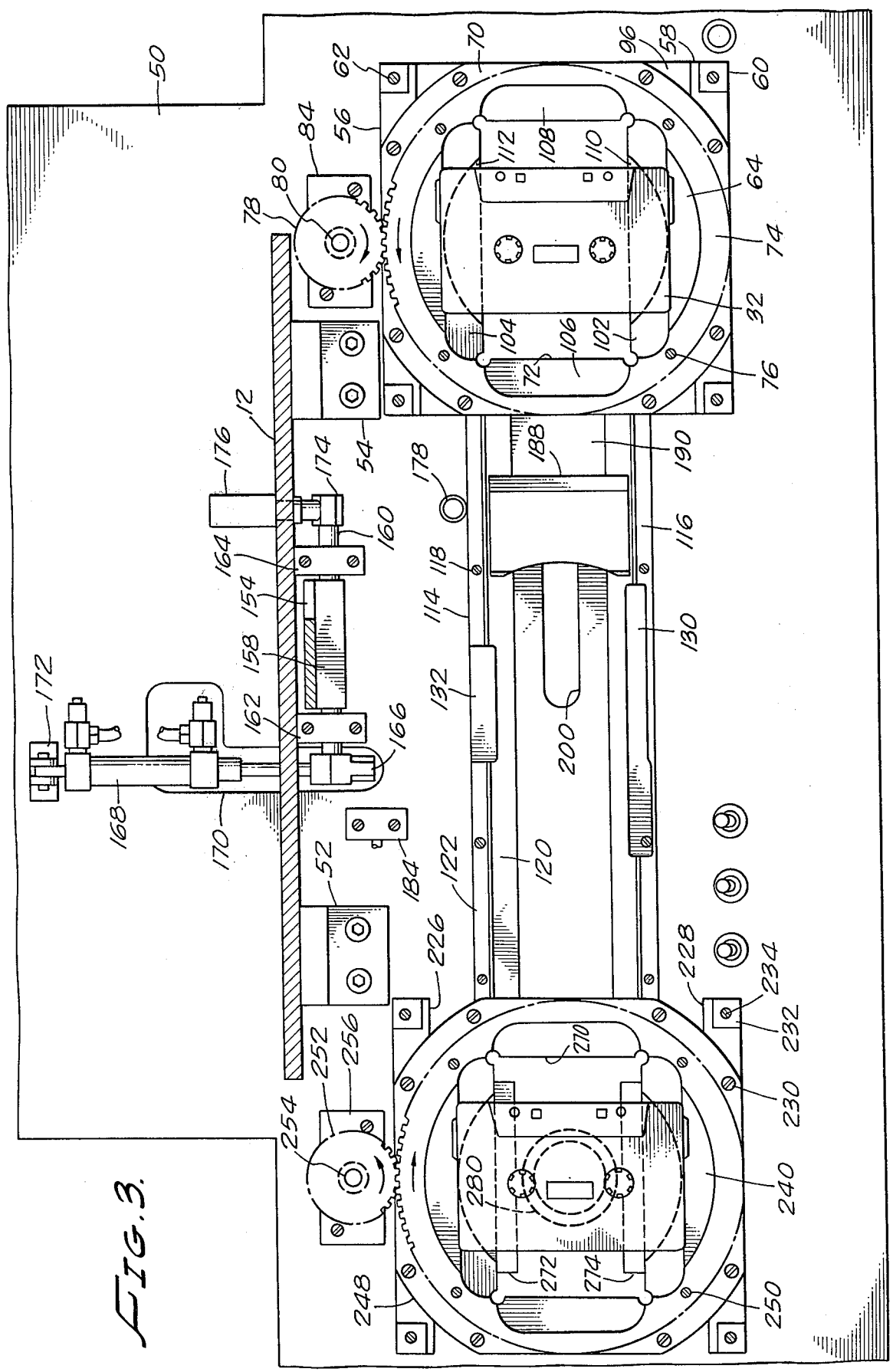
FIG. 3 is a cross-sectional plan as in FIG. 2 with the magazines and fixed plates broken away for clarity.

To facilitate the rotation of the first plate 64 the upper surface of that plate includes a plurality of concave surfaces. These surfaces are best illustrated in FIG. 3 with reference also to FIGS. 7, 8 and 9. Adjacent the long sides of the rectangular first gate 72 are concave surfaces 102 and 104. These surfaces extend downwardly from the plane of the first plate 64 toward the first gate 72. The surfaces 106 and 108 adjacent the ends of the rectangular first gate 72 are also concaved toward the gate. These concaved surfaces 102 through 108 help to avoid interference with the cassette in the stack of cassettes 32 immediately above the cassette positioned within the first gate 72 as seen in FIG. 8. As the first plate 64 rotates, the concaved surfaces engage the second cassette in the stack of cassettes 32 and raise the stack away from the cassette positioned within the first gate 72. Two arcuate cut outs 110 and 112 are also included adjacent the long sides of the rectangular first gate 72. These arcuate cut outs 110 and 112 are designed to prevent the tape access ports from hanging up on the side of the gate as it was it also used in the second gate 100.

Figure 6:
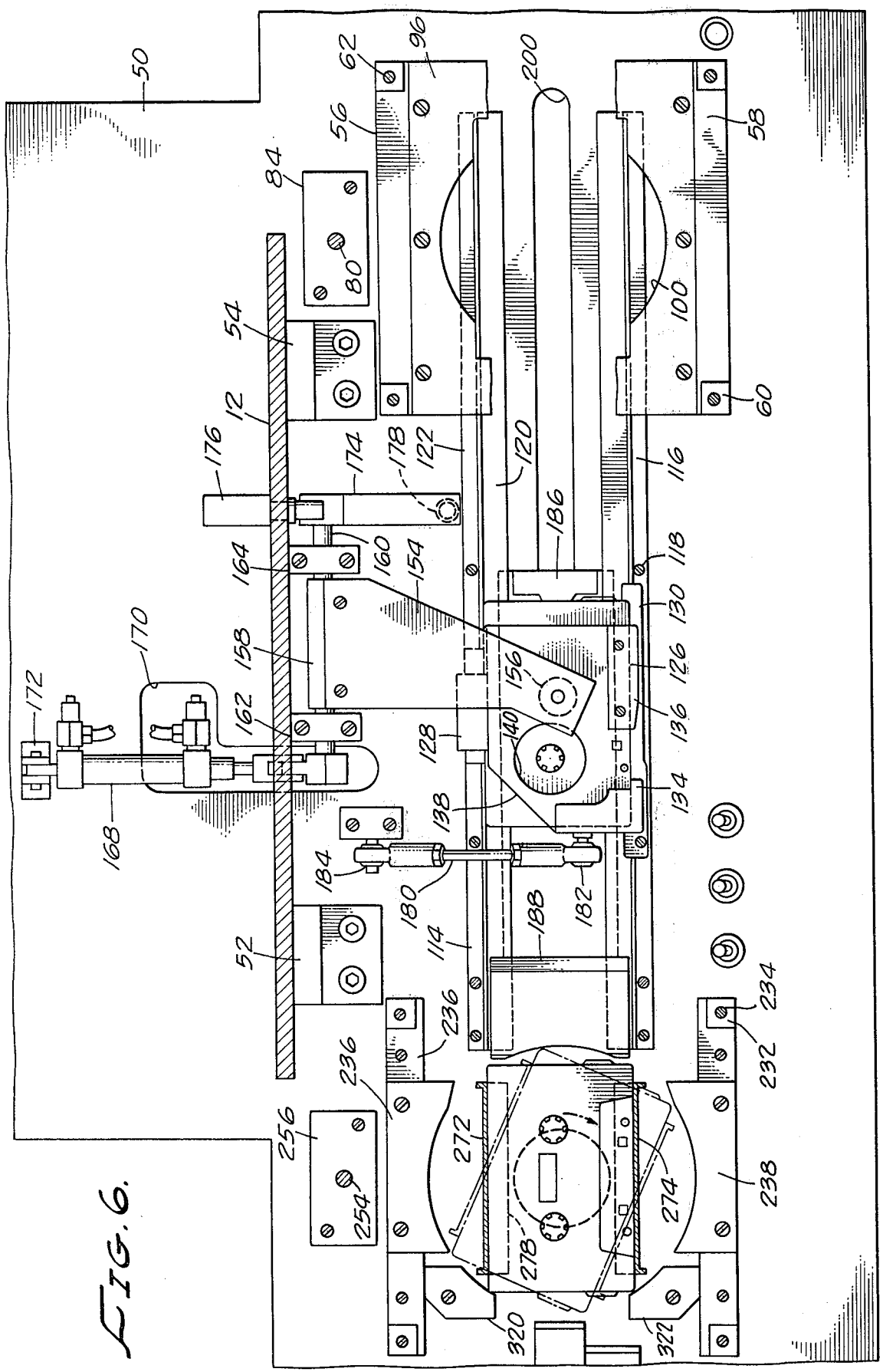
FIG. 6 is a cross-sectional plan as in FIG. 4 with the system at a different operative position.

A track is provided for carrying cassettes from beneath the first gate means as the first gate means drops individual cassettes through the second gate 100. The track may be conveniently described in terms of a number of sections of track based on their function. As can be seen from FIGS. 6 and 7, the first section of track underlying the first gate means is aligned with the second gate 100 such that cassettes passing through the gate 100 will drop directly down onto the track. The track includes two rails 114 and 116 which are fixed to the top of the mounting plate 50 by means of fasteners 118. The cross-section of the rails 114 and 116 can be best seen in FIG. 7 where each rail includes an upper rail surface 120, and upstanding flange 122 and a guide slot 124. The upstanding flanges 122 of the two rails 114 and 116 cooperate to retain the alignment of the cassettes moving along the rails. The guide slots 124 slidably retain a pusher discussed below.

A second section of the track is positioned beneath an output magazine and is defined by brackets rather than the rails 114 and 116. Between the first section beneath the input magazine 26 and the second section beneath the output magazine, there is a third section. The third section of track employs the same rails 114 and 116 but these rails are modified to accept opposed channels 126 and 128. The opposed channels 126 and 128 form a part of the third section of track and when positioned on the rails 114 and 116 form a continuous upper rail surface. To accomplish this, cut outs 130 and 132 exist in the rails 114 and 116. A fourth seciton of track which is simply a continuation of the rails 114 and 116 between the third section having cut outs 130 and 132 and the second section beneath the output magazine provides a means for conveying cassettes from the third section to the second section.

Figure 14:
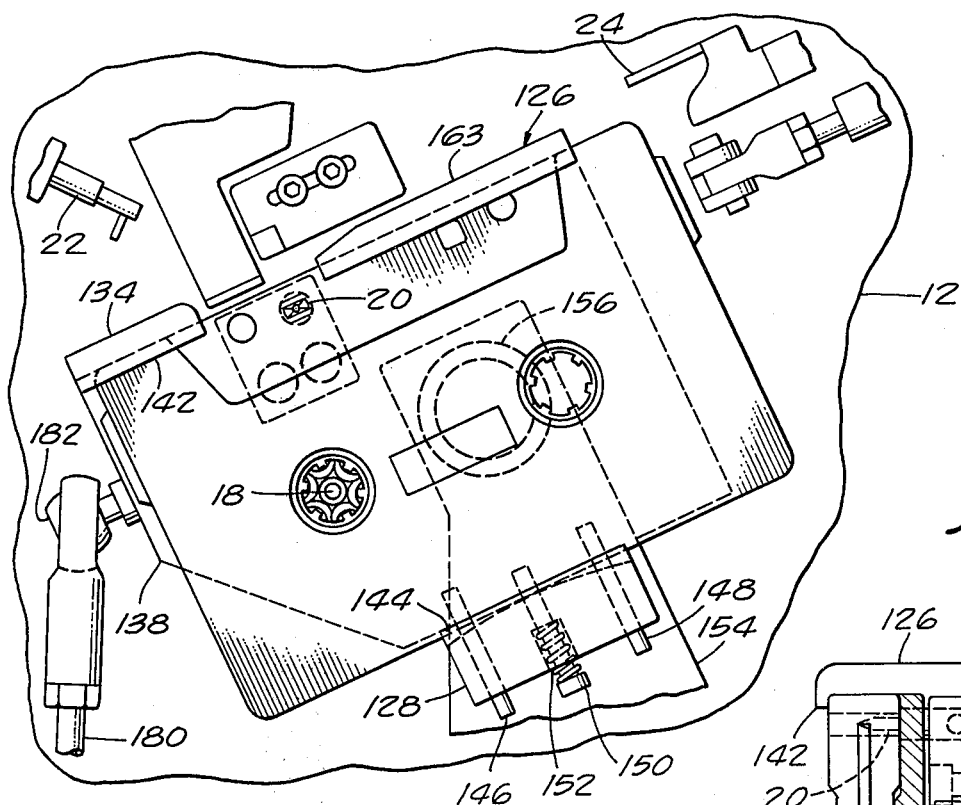
FIG. 14 is a cross-sectional side view taken along line 14—14 of FIG. 1.
Figure 13:
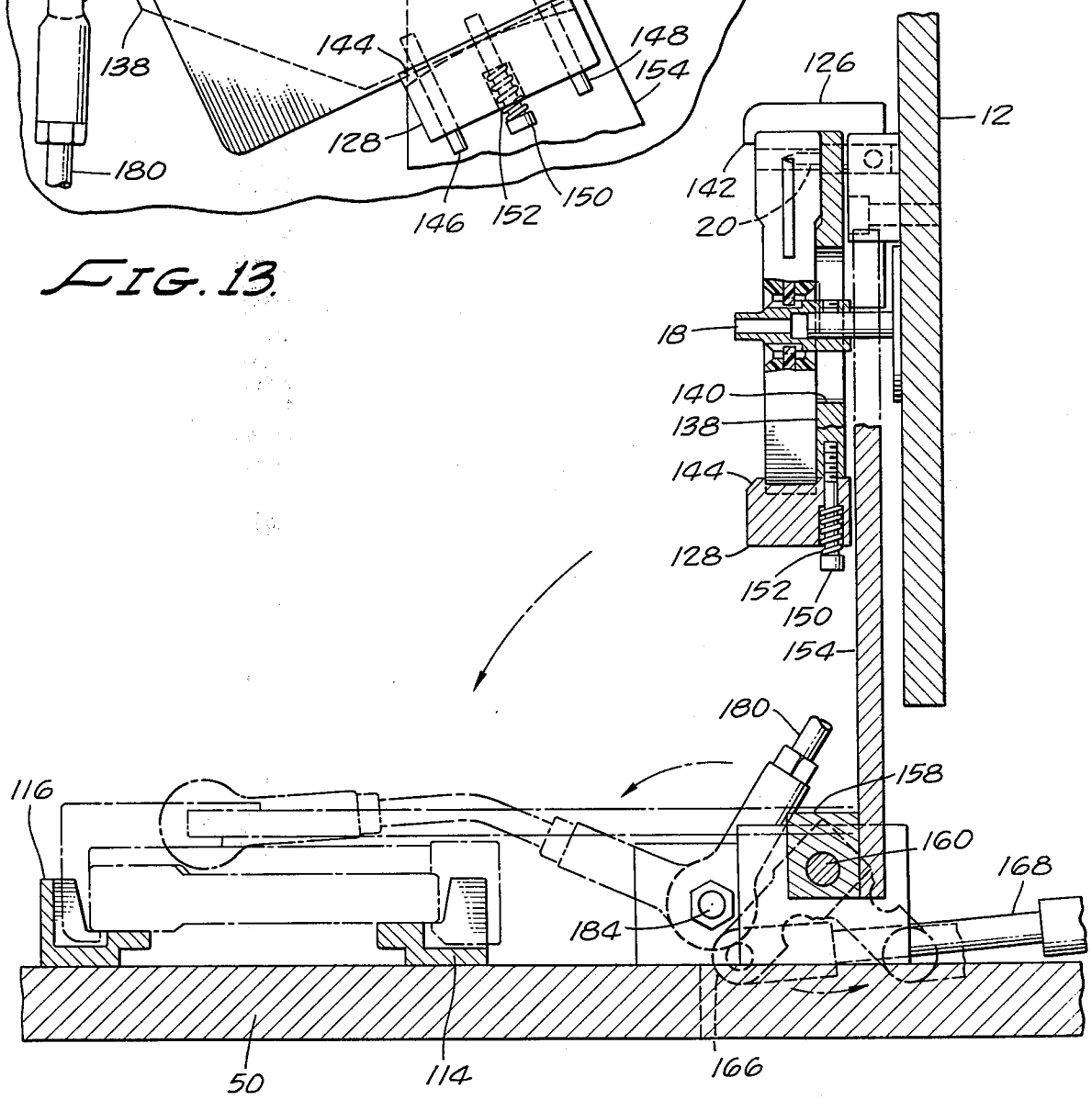
FIG. 13 is a detailed elevation of the work station associated with a cassette handling device of the present invention.

Looking in more detail to the opposed channels 126 and 128, two channel members 134 and 136 make up the channel 126. These channel members 134 and 136 are mounted to a frame plate 138. The frame plate which can best be seen in FIG. 4 is generally rectangular with one corner removed for clearance purposes. Furthermore, a circular opening 140 is provided for access to the spool of a cassette located in the opposed channels. The frame plate 138 itself provides one side of the opposed channels 126 and 128 as they grip a cassette. FIG. 14 illustrates a cassette positioned within the opposed channel assembly. Small flanges 142 and 144 associated with the channel members 134 and 136 retain the cassette from movement transverse to the direction of the track. The channel 128 is also associated with the frame plate 138. This association is spring loaded as seen in FIGS. 13 and 14. Pins 146 and 148 retain the orientation of the channel 128 while a retaining screw 150 is associated with a spring 152 to bias the channel 128 toward the opposed channel 126. The channel surface receiving the cassette is arcuate to allow facile movement of the cassette into a position between the opposed channels and under compression.

The opposed channel assembly including the channels 126 and 128 and the frame plate 138 is pivotally mounted to an arm 154 about a pivot 156. The arm 154 is also pivotally mounted at a distance from the pivot 156. This pivotal mounting of the arm 154 is about an axis which is roughly perpendicular to and spaced from the axis of the pivot 156. The arm 154 is fixed to a block 158 associated with a shaft 160. This shaft 160 is mounted in bearing blocks 162 and 164. The shaft 160 extends beyond the bearing blocks 162 and 164. Past the bearing block 162 the shaft 160 is fixed to a lever arm 166. The lever arm 166 is pinned to one end of an extensible cylinder 168. Clearance is provided for the cylinder and the lever arm by means of a slot 170 in the mounting plate 50 as can be seen in FIG. 4. The other end of the extensible cylinder 168 is pinned to the frame of the mechanism by clevis 172. As can be seen in FIG. 14, extension of the cylinder 168 causes the arm 154 to pivot upwardly to the work station on the cassette loader 10. When the cylinder 168 retracts, the arm 154 is positioned back in alignment with the other sections of the track. The other end of the shaft 160 extending beyond the bearing block 164 is fixed to another arm 174 which swings with the arm 154 to encounter and be stopped against stops 176 and 178.

The pivot 156 on the arm 154 allows the opposed channels 126 and 128 to pivot into alignment with the cassette loading mechanism of the loader 10 when the arm 154 moves a cassette up from the track to the work station. This relative position is illustrated in FIG. 1. To control the pivotal movement of the opposed channels 126 and 128, a link 180 is coupled to the channel member 134 at a first end and to the mounting plate 50 at the other end. The first end of the link 180 is mounted to the channel member 134 by means of a swivel 182. The other end of the link 180 is fixed to a pivot 184 fastened to the mounting plate 50. The pivot 184 has an axis parallel to the bearing blocks 162 and 164 but is displaced toward the track. Consequently, as the arm 154 pivots to the work position, the shorter link 180 draws the near end of the opposed channels 126 and 128 downwardly for alignment with the cassette loader 10. This position is best illustrated in FIG. 13. Careful alignment is achieved by employment of the link 180 and is further aided by the guide pin 20 and the spindle 18.

To move cassettes along the track from beneath the input magazine 26, an advancement means is employed. The advancement means includes a first pusher 186 and a second pusher 188. The first and second pushers 186 and 188 are fixed together by means of a bar 190 constrained to slide in the guide slots 124. The pusher assembly is controlled by an extensible cylinder 192 which is fixed beneath the mounting plate 50 on an angle bracket 194 and 196. The piston end of the cylinder 192 is fixed to a member 198 depending from the bar 190. A slot 200 in the mounting plate 50 provides access to the pusher assembly from under the mounting plate 50.

The stroke of the cylinder 192 has been selected to move a cassette from a position beneath the input magazine 26 along the track to between the opposed channels 126 and 128. As a cassette positioned in the opposed channels is held there by compression, proper placement by the first pusher 186 will be maintained while the third section of track is rotated to the work position.

The distance between the input magazine to the opposed channels 126 and 128 is roughly the same as the distance between the opposed channels 126 and 128 and the output magazine. Because of this, the second pusher 188 is able to move a cassette along the track from the third section of track to a position beneath the output magazine. During full operation, the two pushers each are pushing cassettes simultaneously, one from beneath the input magazine 26 and one to a position beneath the output magazine. Because of the interference which would occur between a cassette positioned by the first pusher 186 and a return of the second pusher 188, the pushers are not returned to their initial position until the third section of track is rotated to the work station. Once that occurs, the pushers return, a new cassette is released from magazine 26 onto the track and the cassette being loaded at the work station is eventually returned to between the first and second sections of the track. The pushers can then be energized again to force cassettes along the track. To aid the second pusher and the fourth section of track, a guide plate 202 insures that passing cassettes are held down on the track.

At the far left of the embodiment as disclosed in FIG. 1, an output magazine 204 is positioned to reseive cassettes which have been operated on at the work station. As with the input magazine 26, the output magazine is formed from two channels 206 and 208 which enclose the ends of cassettes positioned therein. Channels 206 and 208 are spaced so that an operator can gain manual access to cassettes held within the magazine. Flared tabs 210, 212 and 214 help ease introduction of cassettes into the magazine from above if that becomes desired. The channels 206 and 208 include mounting flanges 216, 218 and 220 as employed with the input magazine 26. The mounting flanges of the output magazine 204 are mounted to a guide plate 222 which includes a port 224 that is tapered to have a larger entrance from below as cassettes move upwardly through the port. The port 224 is roughly rectangular to approximate the shape of a cassette and yet to allow a cassette to pass therethrough when properly aligned. The output magazine 204 and the guide plate 222 are supported in a similar manner to the input magazine 26. Hopper mounting blocks 226 and 228 are fixed to the mounting plate 50 be means of fasteners 230. Mounted at the ends of these blocks 226 and 228 are frame posts 232. The frame posts 232, the guide plate 222 and the mounting blocks 226 and 228 are all held together by means of fasteners 234. Guides 236 and 238 having arcuate inner surfaces are also positioned on the mounting blocks 226 and 228.

A second gate means is associated with the output magazine 204 to control orientation and retention of cassettes in the output magazine. This second gate means includes a third plate 240. This plate is pivotally mounted to the mounting blocks 226 and 228 and the guides 236 and 238 by means of a thrust bearing 242. The construction of the third plate 242 is identical to that of the first plate 64 in its mounting of the thrust bearing 242, its cylindrical portion 244 and its flanged portion 246. The upper surface of the third plate 240 also includes concaved surfaces and arcuate cutouts identical to and for the same purposes as those features numbered 102 through 112 of the first plate 64.

Figure 5:
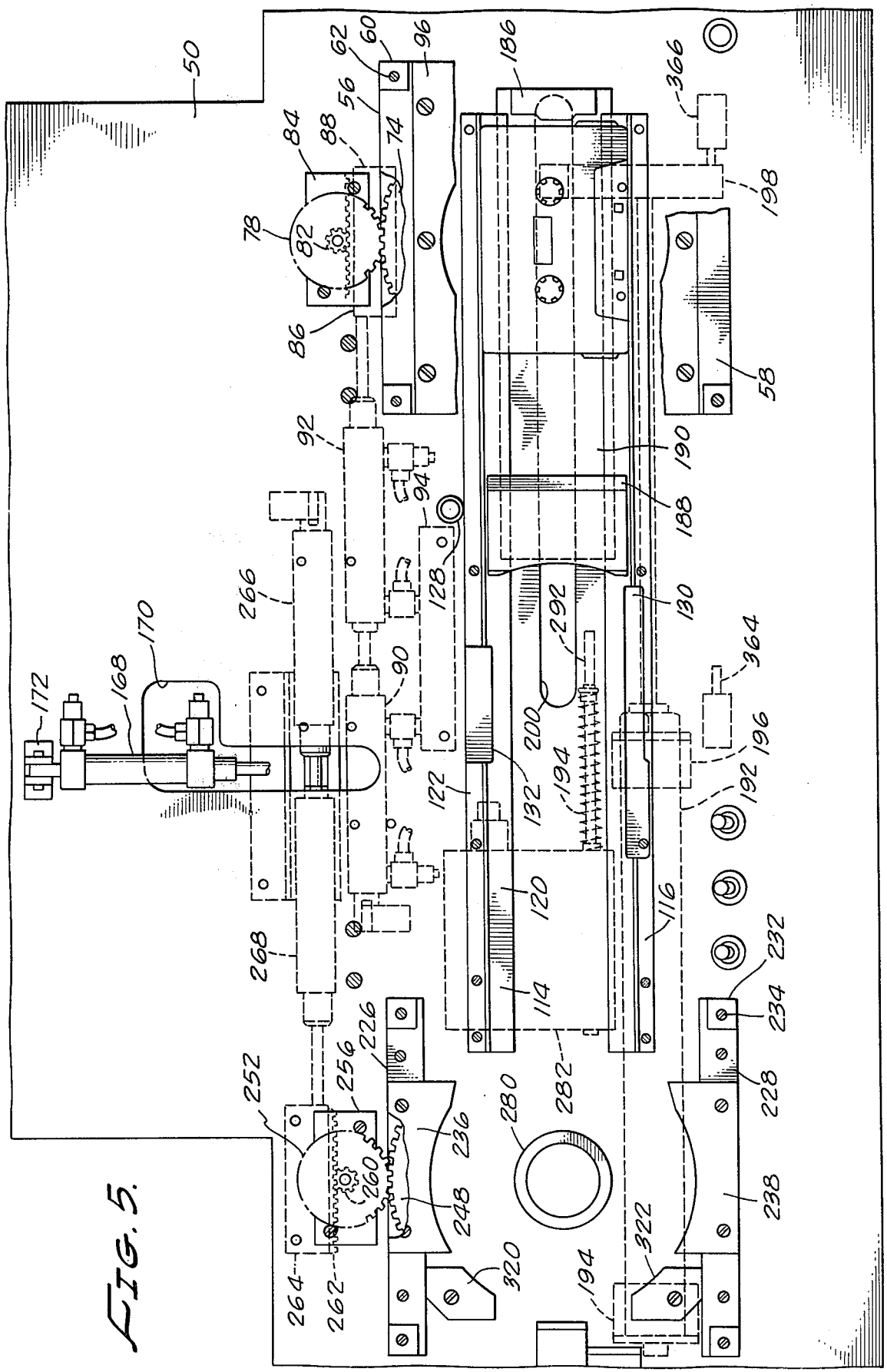
FIG. 5 is a cross-sectional plan as in FIG. 2 illustrating the plate indexing mechanisms.

As graphically illustrated in FIG. 5, the third plate indexing means for pivotally driving and positioning the third plate 240 is also substantially identical to the first plate indexing means discussed above. A ring gear 248 is fixed to the top surface of the flange portion 246 of the third plate 240. Fasteners 250 fix the ring gear 248 to the plate 240. The ring gear 248 is coupled to a spur gear 252 associated with a shaft 254 rotatably mounted in a bearing assembly 256. At the second end of the shaft 254, a pinion 260 engages a rack 262. The rack is constrained to move in a linear path by a rack guide 264 fixed to the underside of the mounting plate 50. As with the first plate indexing means, longitudinal movement of the rack 262 results in pivotal movement of the third plate 240.

A drive mechanism for the second rack 262 is also like that associated with the first rack 86. Two pneumatic cylinders 266 and 268 are mounted in tandem with one end of one cylinder driving the rack and the other end of the other cylinder being fixed to the mounting palte 50. Selection of the several combinations of piston positions results in three rest positions for the rack 262 which cause the third plate 240 to be positioned in three positions each 90 degrees apart.

The third plate 240 includes a third gate 270 therethrough. The third gate is sized to approximate the shape of a cassette for easy passage therethrough when the cassette is aligned with the gate 270. Below and aligned with the third gate 270 are two guide rails 272 and 274. The guide rails 272 and 274 each include a mounting flange 276 and a rail flange 278. In this way, the guide rails 272 and 274 are fixed to the underside of the third plate 240 to define a track for receipt of cassettes. The guide rails 272 and 274 thus form the second section of the track which is aligned with the remaining portion of the track in a first position but is rotated 90 degres in either direction with the third plate 240 at selected times.

The center position of the third gate 270 is aligned with the track so that cassettes entering into the second section of track are aligned for passage through the gate. The port 224 located in the guide plate 222 is arranged with the major dimension of the port perpendicular to that of the third gate 270 when the third gate is in that central position. Thus, the third gate 270 holds all of the cassettes positioned within the output magazine 204 in place while receiving an additional cassette from below. The third plate 240 may then be rotated in either direction to align the third gate 270 and the port 224 for passage of additional cassettes up into the output magazine 204.

Figure 10:
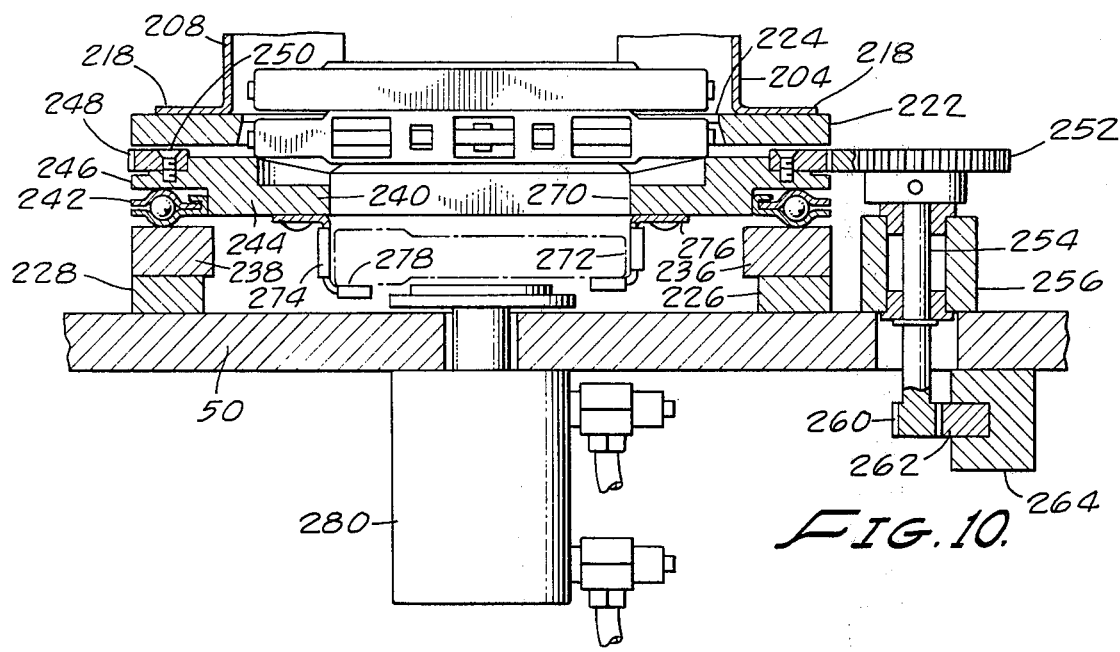
FIG. 10 is a cross-sectional elevation taken along line 10—10 of FIG. 1.
Figure 11:
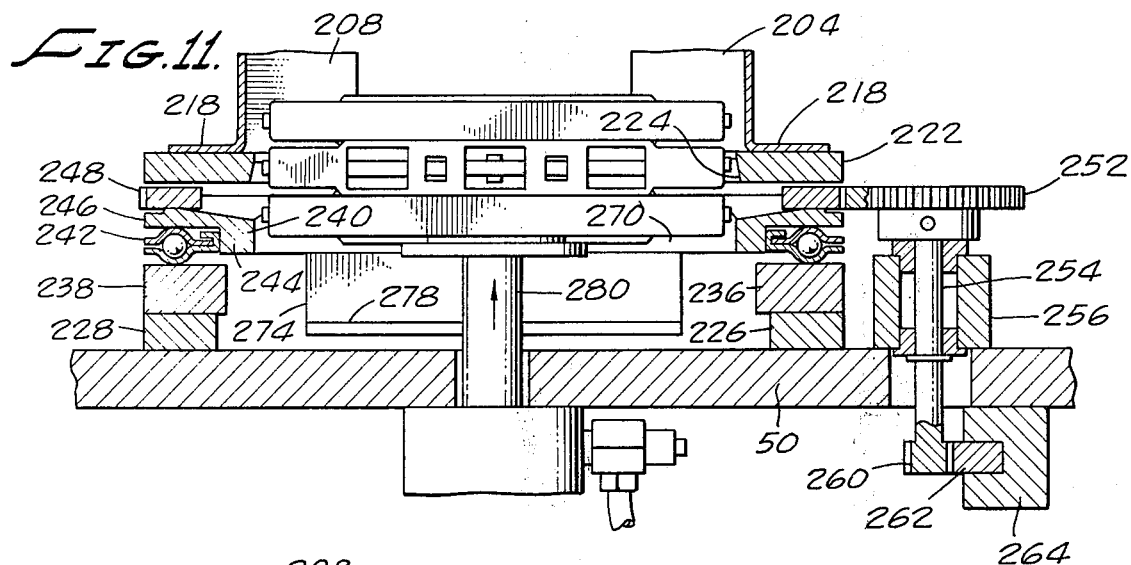
FIG. 11 is a cross-sectional elevation taken along line 10—10 of FIG. 1 illustrating a different operational position of the system.
Figure 12:
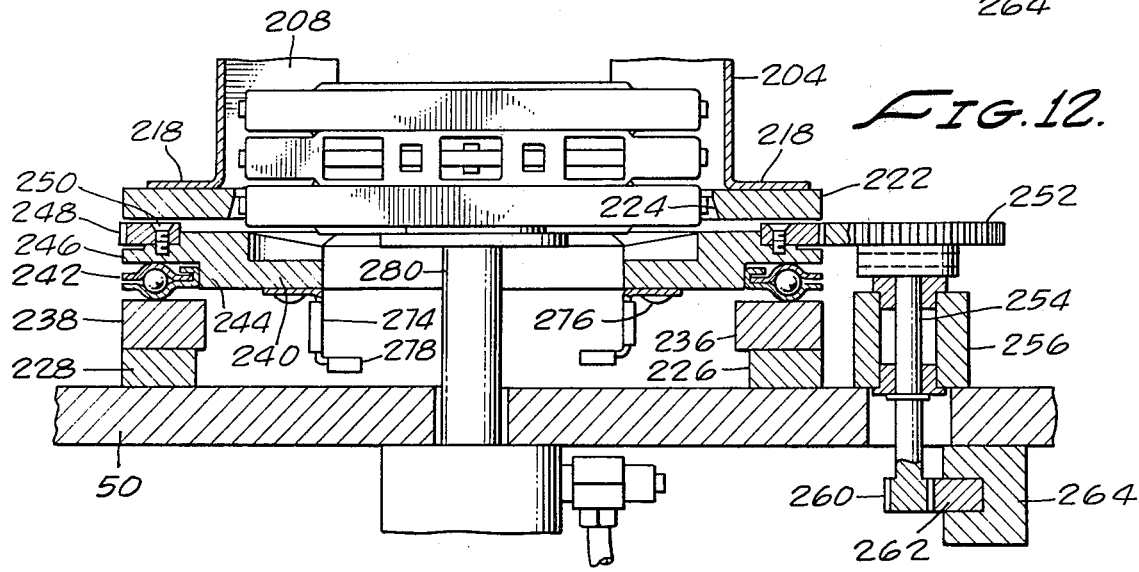
FIG. 12 is a cross-sectional elevation taken along line 10—10 of FIG. 1 illustrating yet another operational position of the system.

To force the incoming cassettes up into the output magazine 204, a piston 280 extends from beneath the mounting plate 50. The orientation and action of the piston 280 may best be seen in a sequential FIGS. 10, 11 and 12. The rotation of the third plate 240 selects which direction the tape access ports of the cassettes will be facing in the output magazine 204.

The preferred embodiment illustrates a mechanism for providing either a pattern of stacking for the cassettes in the output magazine 204 where each cassette faces in the opposite direction in an alternating pattern or where six cassettes face in the same direction with each succeeding set of six facing in an alternating pattern in opposite directions. A mechanical system for controlling the fluid control system for selecting the orientation of each succeeding cassette placed in the output magazine 204 is employed in the preferred embodiment. This device is shown in FIGS. 17, 18 and 19 and is shown in position on the overall cassette handling device in FIG. 5. The mechanism includes a housing 282 fixed to the underside of the mounting plate 50. Located within the housing is a shaft 284. The shaft 284 is mounted in bearings 2886 and 288 and has fixed thereto a ratchet wheel 290. Also located in the housing 282 is a rod 292 which extends from the housing 282 in the path of the pusher assembly. The rod 292 is sprung loaded by means of spring 294 and carries a bracket 296. A pawl arm 298 is pivotally mounted to the shaft 284 and is held by the bracket 296. Thus, when the rod 292 is driven against the spring 294 by the pusher assembly, the pawl arm 298 is pivoted. A pawl 300 is positioned on the pawl arm 298 and is spring loaded to engage the ratchet wheel 290. Interlocking engagement of the pawl 300 and the ratchet wheel 290 occurs when the rod 292 is forced against the spring 294 by means of the pusher assembly. A second pawl 302 mouned to the housing 282 prevents rotation of the ratchet wheel 290 in the opposite direction during return of the first pawl 300 to its rest position. Thus, each stroke of the pusher assembly advances the ratchet wheel 290 and the attached shaft 284 a fixed amount.

Also fixed to the shaft 284 are two cams. The first cam 304 is seen in FIG. 17 as having six lobes 306 alternating with six low portions 308. A follower 310 is pivotally mounted to the housing 282 to follow the first cam 304 and to actuate a switch through cable 312. The second cam 314 is best seen in FIG. 19 in association with its follower 316 also pivotally mounted to the housing 282 to actuate a second switch by means of cable 318. Because of the discrete steps of the pawl and ratchet mechanism, the lobe on the second cam affects the positioning of six cassettes while the valley also affects the positioning of six cassettes.

A reject feature is provided by means of spring mounted stop 320 and 322. These stops are thus illustrated in FIG. 4 in their receiving and reject positions. The stops are actuated by simply forcing the cassette against the spring loading thereof. When a cassette has not been properly loaded in a manner which can be sensed by the cassette loader, the piston 280 is disabled which leaves the rejected cassette in the second section of the track in the guide rails 272 and 274. The next cassette which passes across the fourth section of the track then pushes the rejected cassette through the stops 320 and 322. The next properly loaded cassette is then capable of moving up upon activation of the piston 280 in the normal manner.

Figure 20:
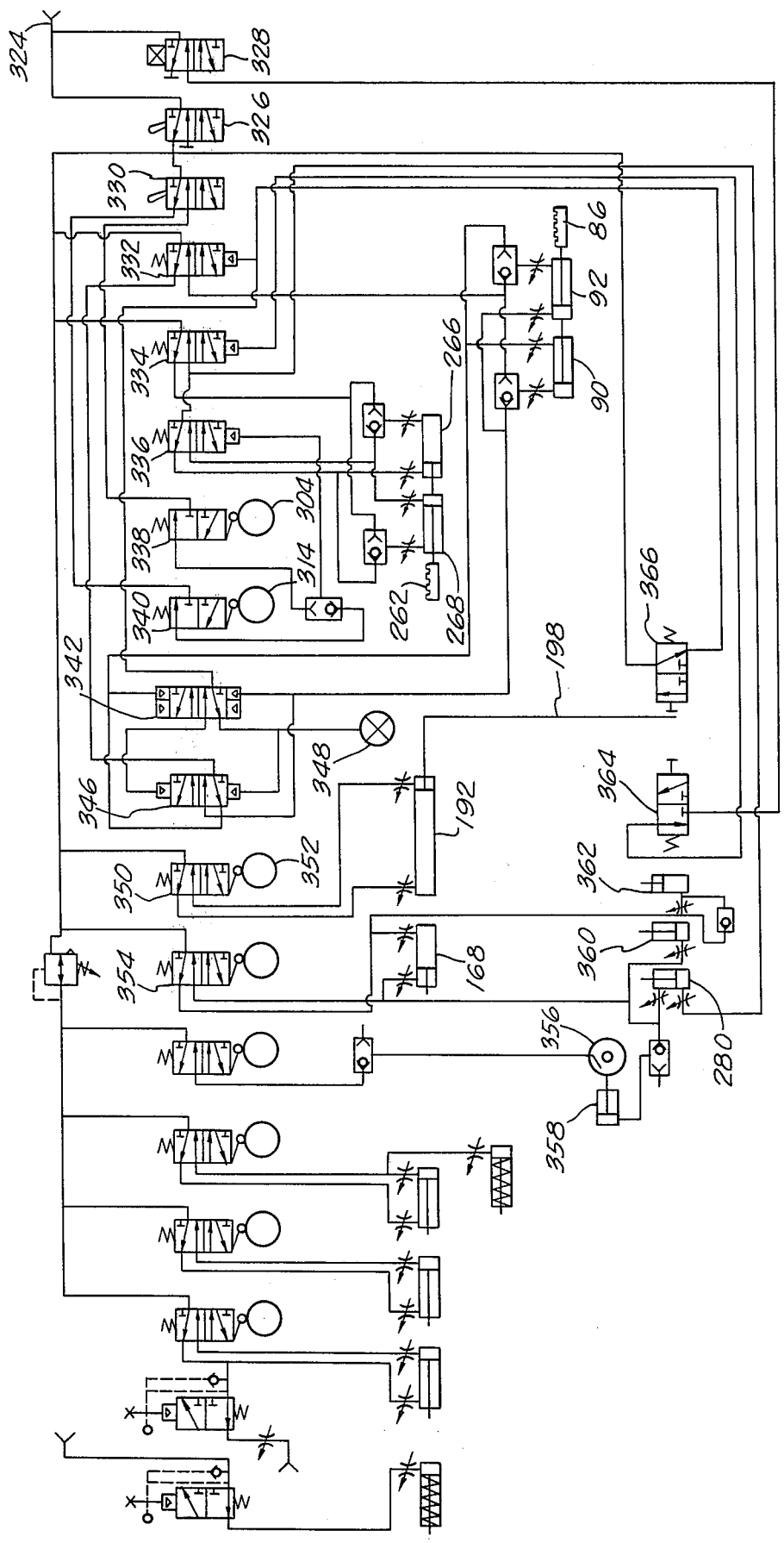
FIG. 20 is a control schematic for the device of the present invention.

FIG. 20 illustrates a control system which, in the preferred embodiment, is pneumatic. The control system elements relevant to the present invention are illustrated in FIG. 20 as including an air inlet 324, a main air on and off switch 326 and a left hopper enabling valve 328 as the main power source control for the system. Switch 330 determines the stacking0arrangement in the output magazine 204. Valve 332 controls the right hopper index function and valves 334 and 336 control the left hopper index function. Valves 338 and 340 are driven by cams 304 and 314 to actuate indexing of the output hopper system. Valves 342 and 346 provide logic for alternating the indexing of the input hopper and indicator 348 is controlled by valve position 342. The indicator 348 shows the operator which way to load the cassettes into the input hopper 26, that is whether the bottom cassette of the stack 32 is to have its access port facing left or right. An alternate embodiment which may be employed where the initial stacking of the cassettes cannot be predicted may include a proximity sensor or series of same which distinguishes the orientation of the bottom most cassette of the stack in the input magazine and controls automatically the valve 332.

Valve 350 actuates the pusher in respone to position of a cam 352. The cam 352 is associated with the tape loading device. Valve 354 controls the cylinder 280 to actuate the arm 154. The remaining valves to the left of valve 354 are associated with the threading mechanism and are not of relevance here. A take up motor 356 is also associated with the threading mechanism; however, it has been found that a brake 358 associated with the cylinders 168 and 280 is advantageous. This prevents breaking of the tape during the loading process. The cylinders 360 and 362 are employed as shock absorbers and energy storage devices during operation of the equipment. Valves 364 and 366 operate as limit switches is by interfering with the travel of the member 198 to control the cylinder 192 of the tape advancement system. The pneumatics of FIG. 20 are shown with the cam 352 in the start of the cycle and the solinoid for ejecting a defective cassette in the eject mode.

By means of the equipment described above and the pneumatic system shown in FIG. 20, the first gate means is actuated to rotate in a manner predicted by the indicator 348 to accept a cassette from the input magazine 26. This first cassette falls into the gate 72 and is retained there until the first plate 64 rotates back into alignment with the gate 100 in the second plate 96. At this time, the cassette brought into the first gate 72 falls onto the track having rails 114 and 116. With the opposed channels 126 and 128 in alignment with the main portion of the track, the first pusher 186 forces the cassette released from the input hopper assembly to the third section between the opposed channels 126 and 128. The arm 154 is then rotated up and the loading function is carried out. During the loading operation, the pushers 186 and 188 return to their far right position as seen in FIG. 1. Once the cassette has been loaded, the arm 154 returns to its down position and the pusher 188 forces the cassette contained within the opposed channels 126 and 128 to the output hopper system. The piston 280 then moves to force the cassette contained in the guide rails 272 and 274 upwardly. At this time, the third plate 240 rotates to arrange the cassette in proper angular alignment for entry into the output magazine 204. While the piston 280 is extended to hold the nested cassettes above the third plate 240, the third plate 240 returns to its aligned position with the track in preparation for the acceptance of further cassettes.

While embodiments and applications of this invention have been shown and described, it would be apparent to those skilled in the art that many more modifications are possible without departing from the inventive concepts herein. The invention, therefore, is not to be restricted except by the spirit of the appended claims.

What is claimed is:

1. A cassette handling device for individually handling cassettes stacked with the tape access ports thereof facing in a plurality of directions, comprising
   a frame;
   a first plate pivotally mounted relative to said frame to support the stack of cassettes and having a first gate therethrough sized for facile passage of cassettes when said first gate is in substantial angular alignment with the stack of cassettes and retention of cassettes when said first gate is in substantial angular misalignment with the stack of cassettes;
   a second plate fixed relative to said frame below said first plate and having a second gate therethrough in substantial center line alignment with said first gate and sized for facile passage of cassettes substantially angularly aligned with said second gate and retention of cassettes substantially angularly misaligned with said second gate, the entrance to said second gate being spaced from the entrance to said first gate by about the thickness of one cassette, said second gate being in angular misalignment with said first gate when said first gate is in angular alignment with the stack of cassettes above said first gate; and
   first plate indexing means for pivotally driving and positioning said first plate to accept cassettes from the stack and for selectively pivoting said first plate to position cassettes in said first gate in angular alignment with said second gate and with the tape access ports of the cassettes adjacent a first side of said second gate.

2. The cassette handling device of claim 1 further comprising a magazine fixed relative to said frame above said first plate to hold the stack of cassettes.

3. The cassette handling device of claim 1 wherein said first gate is substantially rectangular to approximate the shape of the cassettes and said first plate includes an upper surface concaved at the ends of said substantially rectangular gate.

4. The cassette handling device of claim 1 wherein said indexing means is designed and constructed to pivot said first plate to accept cassettes from the stack with the tape access ports of the cassettes adjacent a first side of said first gate.

5. The cassette handling device of claim 1 further comprising a track fixed relative to said frame, below and aligned with said second gate to accept cassettes passing through said second gate.

6. The cassette handling device of claim 5 further including
   a third plate pivotally mounted relative to said frame, above said track and displaced along said track from said second plate and having a third gate therethrough sized for facile passage of cassettes in substantial angular alignment with said third gate and retention of cassettes positioned above said third gate in substantial angular misalignment with said third gate; and
   a piston fixed relative to said frame to extend upwardly from below said track through said third gate to force cassettes through said third gate;
   said track including a first section fixed relative to said frame and a second section below said third gate fixed to pivot with said third plate.

7. The cassette handling device of claim 6 further comprising third plate indexing means for pivotally driving and positioning said third plate to align said section of said track with said first section to accept cassettes from said first section and to position cassettes passing through said third gate in a stack above said third plate with the tape access ports of the cassettes facing in a predetermined pattern.

8. The cassette handling device of claims 5, 6 or 7 further comprising advancement means for advancing cassettes along said track from beneath said second plate.

9. The cassette handling device of claims 6 or 7 wherein said track includes a third section pivotally mounted relative to said frame about a first axis displaced from said track.

10. The cassette handling device of claim 9 wherein said third section includes opposed channels positioned to constrain cassettes from movement transverse to said third section of said track and an arm pivotally mounted relative to said frame to which said opposed channels are mounted.

11. The cassette handling device of claim 10 wherein said opposed channels are pivotally mounted to said arm about a second axis acts parallel to said first axis, said track further including a link pivotally fixed relative to said frame about a third axis displaced from said first and second axes and swivelly attached to said opposed channels.

12. The cassette handling device of claim 9 wherein said third section is positioned between said first and second sections.

13. The cassette handling device of claim 12 further comprising advancement means for advancing cassettes along said track from beneath said second plate said advancement means includes a first pusher to move cassettes from beneath said second plate along said track to said third section and a second pusher to move cassettes from said third section.

14. The cassette handling device of claim 1 wherein said first plate indexing means includes a rack, a pinion engaging said rack and coupled to pivot said first plate, and a rack drive having three positions relative to said frame.

15. The cassette handling device of claim 14 wherein said rack drive includes first and second extensible cylinders, a first end of said first cylinder being fixed relative to said frame, a second end of said first cylinder and a first end of said second cylinder being fixed together and a second end of said second cylinder being fixed to said rack.

16. A cassette handling device comprising
   a track for conveying cassettes, said track having first, second and third sections;
   a first magazine designed and constructed to hold a stack of cassettes above said first section of said track, retaining cassettes in an orientation rotated from the orientation of said first section;
   a second magazine designed and constructed to hold a stack of cassettes above said second section of said track;
   first gate means for controlled release of cassettes from said first magazine onto said first section of said track, said first gate means including a first plate pivotally mounted relative to said first magazine about a vertical axis and having a first hole therethrough for accepting cassettes;

second gate means for containment of cassettes in said second magazine and acceptance of cassettes from said second section of said track for containment in said second magazine; and said third section of said track being between said first and second sections and including retaining means for holding cassettes on said third section of said track and placement means for moving said third section of said track and the cassettes contained thereon to a remote work station and back.

17. The cassette handling device of claim 16 wherein said second gate means include a second plate pivotally mounted relative to said second magazine for the orientation of cassettes during acceptance from said track for stacking cassettes in said second magazine with the tape access ports thereof facing in a predetermined pattern in an orientation rotated from the orientation of said second section.

18. A cassette handling device comprising
a station for receiving individual cassettes in a first horizontal orientation;
a magazine positioned above said station and designed and constructed to retain a stack of cassettes in horizontal orientations rotated from said first orientation;
a stationary gate between said station and said magazine for passage of cassettes therethrough, said stationary gate being aligned with said station; and
a pivotally mounted gate positioned between said magazine and said stationary gate for passage of cassettes therethrough, said pivotally mounted gate being selectively alignable with said stationary gate and with the cassettes in said magazine.

19. A cassette handling device comprising
a stationary plate horizontally disposed and having a stationary gate therethrough for passage of cassettes in a first horizontal orientation; and
a pivotally mounted plate horizontally disposed above said stationary plate and including a movable gate for passage of cassettes therethrough, said movable gate being selectably alignable with said stationary gate, the distance between the top surfaces of said stationary plate and said movable plate being about equal to the maximum thickness of each cassette, said movable plate further including concavities in the top surface thereof about said movable gate adjacent to the periphery of said movable gate.

20. A cassette handling device comprising
a station for receiving individual cassettes in a first horizontal orientation;
a magazine positioned above said station and designed and constructed to retain a stack of cassettes in horizontal orientations rotated from said first orientation;
a stationary plate between said station and said magazine, horizontally disposed and having a stationary gate therethrough for the passage of cassettes in a first horizontal orientation, said stationary gate being aligned with said station; and
a pivotally mounted plate horizontally disposed between said stationary plate and said magazine and including a movable gate for passage of cassettes therethrough, said movable gate being selectably alignable with said stationary gate and with the cassettes in said magazine, the distance between the top surfaces of said stationary plate and said movable plate being about equal to the maximum thickness of each cassette, said movable plate further including concavities in the top surface thereof about said movable gate adjacent to the periphery of said movable gate.

* * * * *